March 30, 1965     J. J. RUDIGIER, JR     3,175,391
MOISTURE TESTER
Filed Sept. 8, 1961     2 Sheets-Sheet 1
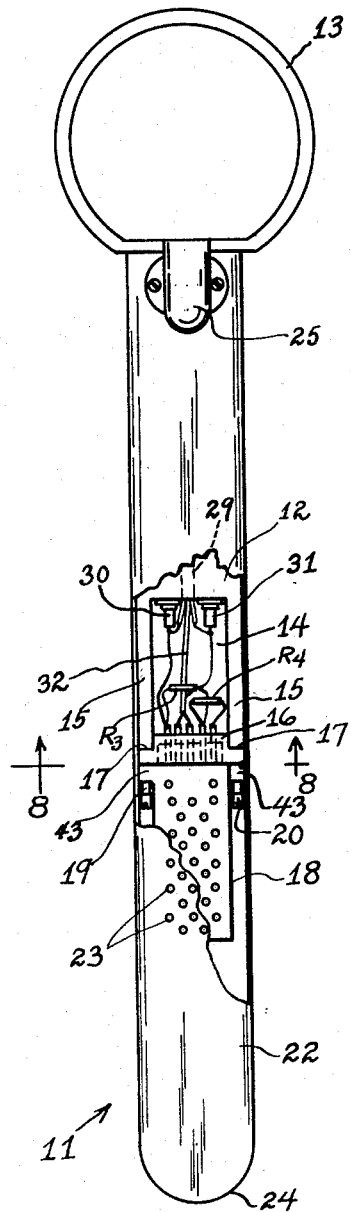
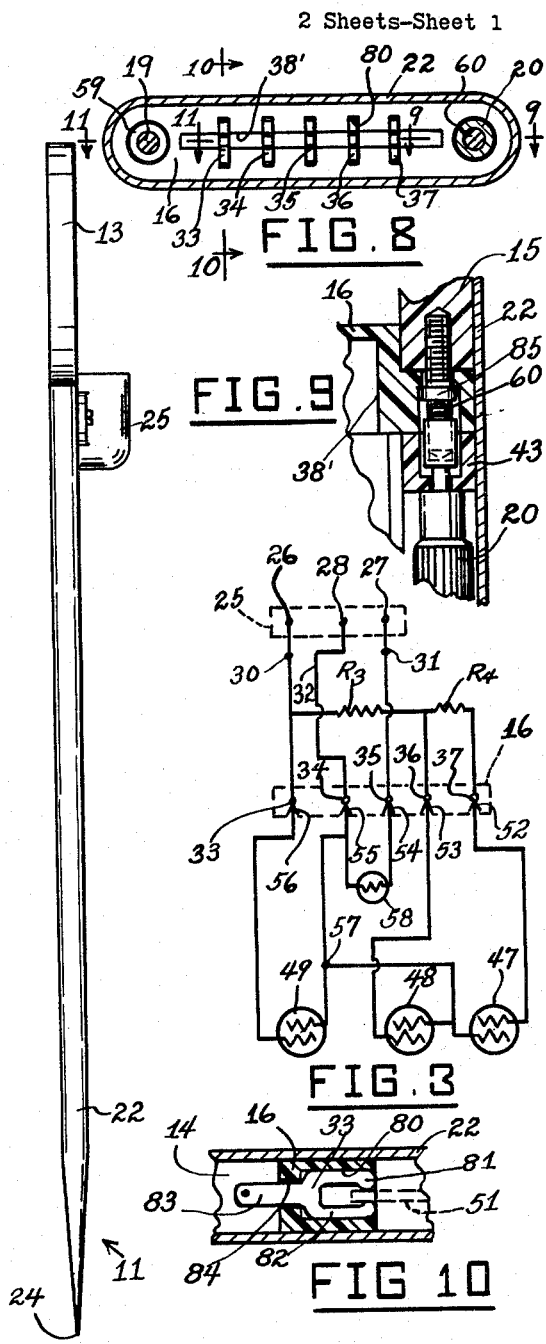
INVENTOR.
JOSEPH J. RUDIGIER, JR.
BY Herman J. Gordon
ATTORNEY March 30, 1965     J. J. RUDIGIER, JR     3,175,391
MOISTURE TESTER
Filed Sept. 8, 1961     2 Sheets-Sheet 2
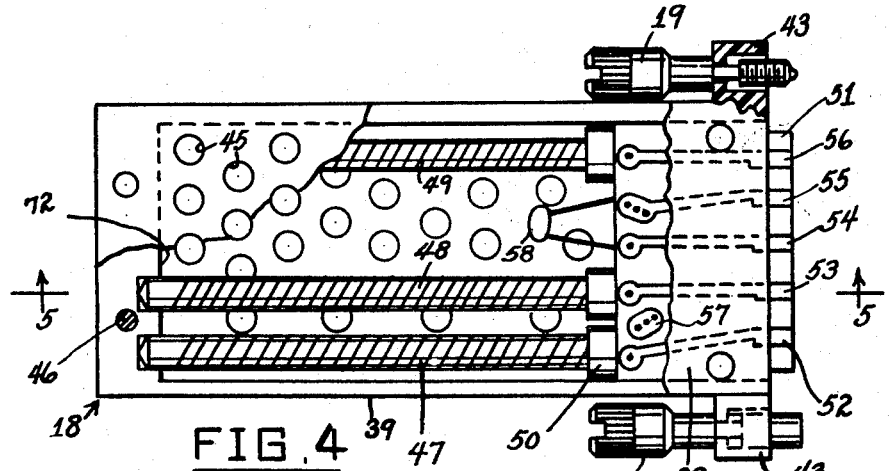
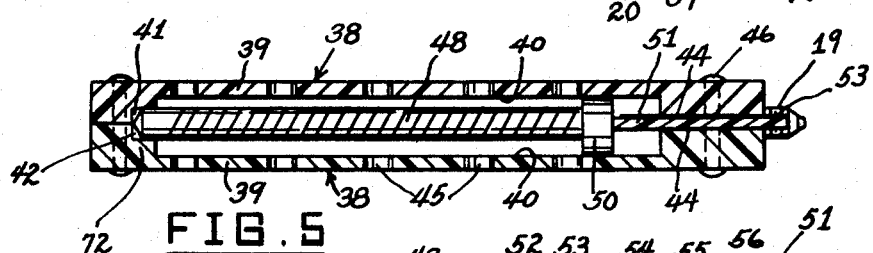
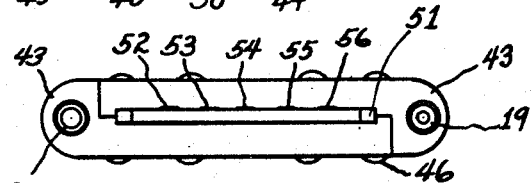
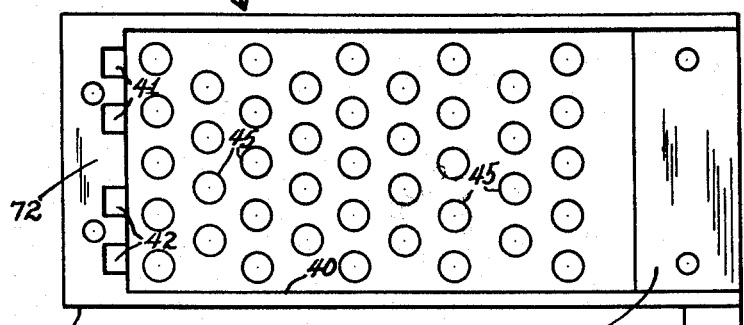
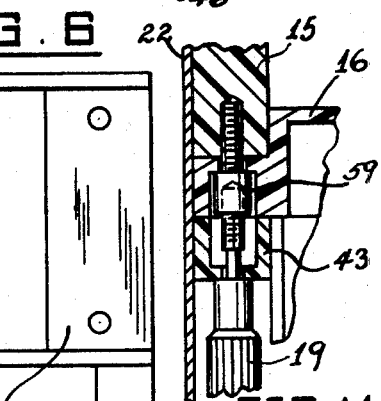
INVENTOR.
JOSEPH J. RUDIGIER, JR
BY /Herman L. Gordon/
ATTORNEY

3,175,391
MOISTURE TESTER
Joseph J. Rudigier, Jr., Bethesda, Md., assignor to Hygrodynamics, Inc., Silver Spring, Md.
Filed Sept. 8, 1961, Ser. No. 136,913
10 Claims. (Cl. 73—73)

This invention relates to humidity measuring devices, and more particularly to an improved probe device for measuring the moisture in stacks of sheet material, such as stacks of paper.

A main object of the invention is to provide a novel and improved humidity measuring probe especially adapted for use in detecting and measuring moisture in stacks of sheet material such as paper or the like, said probe being simple in construction, being easy to insert in a stack of sheet material, and being highly sensitive to the moisture contained in the sheet material.

A further object of the invention is to provide an improved humidity measuring probe which is especially formed and arranged for easy insertion in a stack of sheet material, such as paper or the like, said probe being inexpensive to manufacture, being durable in construction, being responsive to a wide range of moisture conditions, and inflicting no damage to the sheet material with which it is used.

A still further object of the invention is to provide an improved humidity measuring probe for use in measuring the humidity in sheet material, such as paper or the like, said probe comprising relatively few parts, being easy to assemble, and being especially adapted for economical manufacture by mass production methods.

A still further object of the invention is to provide an improved temperature and humidity-sensing module assembly especially adapted for use in a probe housing intended to be disposed adjacent to the surface of sheet material for the purpose of detecting and measuring the humidity of the material, the module assembly being compact in size, being durable in construction, being easy to handle for assembly, and having stable response characteristics.

Further objects and advantages of the invention will become apparent from the following description and claims, and from the accompanying drawings, wherein:

FIGURE 1 is a plan view, partly broken away, of an improved moisture testing probe for sheet material constructed in accordance with the present invention.

FIGURE 2 is a side elevational view of the moisture testing probe of FIGURE 1.

FIGURE 3 is a schematic wiring diagram showing the electrical circuit of the moisture testing probe of FIGURES 1 and 2.

FIGURE 4 is an enlarged plan view, partly broken away, of the temperature and humidity-sensing module assembly employed in the probe of FIGURES 1 to 3.

FIGURE 5 is a vertical cross-sectional view taken substantially on the line 5—5 of FIGURE 4.

FIGURE 6 is an end elevational view of the module assembly shown in FIGURES 4 and 5.

FIGURE 7 is a top plan view of one of the mating housing segments of the module assembly of FIGURES 4 to 6.

FIGURE 8 is an enlarged vertical cross-sectional view taken substantially on line 8—8 of FIGURE 1.

FIGURE 9 is a cross-sectional view taken substantially on the line 9—9 of FIGURE 8.

FIGURE 10 is a cross-sectional view taken substantially on the line 10—10 of FIGURE 8.

FIGURE 11 is a cross-sectional view taken substantially on the line 11—11 of FIGURE 8.

Referring to the drawings, 11 generally designates a typical moisture testing probe constructed in accordance with the present invention. The probe 11 comprises an elongated relatively flat main body member 12, which may comprise a flat metal bar, to one end of which is rigidly secured a generally circular handle ring 13, the other end of the bar being formed with a large rectangular notch 14 defining a pair of parallel fingers 15, 15. Designated at 16 is a terminal block of insulating material which is fitted between and extends across the ends of fingers 15, 15, said block 16 being formed with right-angled notches 17, 17 snugly receiving said finger ends. A flat temperature and humidity-sensing module assembly 18 is secured to the ends of the fingers 15, 15 by a pair of fastening members 19 and 20 extending through side lugs 43, 43 provided on the end of the module assembly.

A flat rigid elongated housing 22 of suitable smooth corrosion-resistant material, such as stainless steel, is secured on the body 12, closely embracing same, and surrounding the humidity-sensing module assembly 18. The opposite walls of the housing 22 are formed with apertures 23 adjacent the module assembly to allow free circulation of air therethrough. The end of the housing 22 tapers smoothly to a flat arcuately rounded edge 24 to facilitate the insertion of the probe between the sheets of a stack of paper or other sheet material whose moisture content is to be tested.

A three-terminal electrical connector 25 is secured on the assembly adjacent the handle ring 13, said connector being adapted to receive a conventional plug provided on the end of a cable, not shown, for connecting the probe to a suitable electrical indicating unit. Two of the connector terminals, shown at 26 and 27 in FIGURE 3, are suitably connected by wires extending through a bore 29 in body 12 to terminal posts 30 and 31 secured to and insulated from body 12 in notch 14. A third wire 32, extending through said bore, is connected to the remaining connector terminal 28.

The terminal block 16 is formed with a longitudinal slot or recess 38' and is further formed with grooves 80 transverse to the recess 38' loosely receiving the outer edge portions of the arms 81, 82 of respective Y-shaped terminals 33 to 37 arranged parallel to each other and disposed transverse to the slot 38', the stem portions 83 of the terminals extending through apertures 84 formed in the wall of the block opposite the slot or recess 38'. The arms 81 and 82 are resiliently yieldable relative to each other to receive the edge portion of a terminal board 51 therebetween, as will be presently described, and to conductively engage printed terminal strips thereon. Thus, the stem portions 83 project into the notch 14, whereas the yieldable ends of the contact arms 81, 82 are located adjacent the open end of the slot 38' at the opposite side of block 16.

Terminal 33 is connected to terminal post 30. Terminal 35 is connected to terminal post 31. Terminal 34 is connected to the wire 32. A resistor $R_3$ is connected between terminals 33 and 36. Another resistor $R_4$ is connected between the terminals 36 and 37. The resistors $R_3$ and $R_4$ are housed in the notch 14, and said notch may be filled with a suitable moisture-impervious potting compound to protect the resistors and the wiring in said notch against corrosion or humidity effects, and to fill the air space in the notch with said moisture-impervious material, thereby reducing the response time of the instrument.

The humidity-sensing module assembly 18 comprises a flat housing formed by a pair of identical mating segments 38,38, each segment comprising a generally rectangular molded body 39 formed with a rectangular main cavity 40 and formed with pairs of symmetrically located spaced recesses 41, 41 and 42, 42 at one end wall 72 of the cavity. Each body 39 is formed with an apertured side lug 43 at the end thereof opposite its recessed wall 72, and the inside face of the end wall 44 adjacent the end lug is slightly inwardly offset relative to the remainder of the mating surface of the body. The main walls of the segments are formed with a plurality of apertures 45 distributed substantially uniformly thereover to allow air to freely circulate through the assembly. The segments are secured together in mating relationship by rivets 46 extending through their opposite end portions.

Clamped between the segments 38, 38 are three rod-like bifilar wound humidity sensing elements 47, 48 and 49, said elements having enlarged base portions 50 fitting between the main walls of the segments, the opposite ends of the elements being received in opposing recesses 41, 42 of said segments. A flat terminal board 51 is secured between the inwardly offset faces of the end walls 44, 44 and protrudes forwardly from the assembly, as shown in FIGURES 4 and 5. The terminal board 51 is provided with the respective printed contact elements 52 to 56 having exposed end portions conductively engageable respectively between the resilient contact arms 81, 82 of the terminals 37, 36, 35, 34 and 33 when the module assembly is engaged against the block 16 in the manner illustrated in FIGURE 1. As shown in FIGURES 4 and 5, the terminal board 51 protrudes from the end of the module assembly, and the protruding portion is receivable in the slot 38'.

As shown in FIGURE 3, humidity sensing element 47 is connected between contact element 52 and a terminal spot 57 on board 51. Terminal spot 57 is connected to contact element 55. Sensing element 48 is connected between terminal spot 57 and contact element 53. Sensing element 59 is connected between terminal spot 57 and contact element 56. A thermistor 58 is connected between terminals 54 and 55. Themistor 58 is employed in a conventional manner so that it provides a temperature indication in the external indicating circuit.

The fastening member 19 comprises an externally threaded screw which is engaged in an internally threaded sleeve 59 secured in the end of one of the fingers 15. The fastening member 20 comprises an internally threaded headed sleeve which is threadedly engaged on a stud 60 secured in the end of the other finger 15. As shown in FIGURE 9, stud 60 is provided with an integral clamping collar 85 which clamps one end of the block 16 to the end of the adjacent finger 15. The sleeve 59 acts in a similar manner to clamp the other end of block 16 to the other finger 15, as shown in FIGURE 11. When the fastening members 19 and 20 are tightened, the module assembly 18 is clamped to the terminal block 16 with the contact elements 52 to 56 in conductive engagement with the contact arms of the respective terminals 37, 36, 35, 34 and 33, defining the network shown in FIGURE 3, and securing the module assembly in operative position between the apertured opposite main wall portions of the flat sheath 22. The device may then be connected to the external indicating circuit by a suitable three-wire cable provided with a plug engaged in the connector 25, as above described, and may be employed to measure the relative humidity in a stack of sheet material, such as paper, by inserting the probe device 11 between the sheets of the stack. Since the probe device is of substantial length, it may be employed with relatively large sheets, since the module assembly may be positioned a substantial distance inwardly from the outside edges of the sheets.

Insertion of the probe device between the sheets is facilitated by the provision of the smoothly tapered probe end terminating in the arcuately rounded edge 24.

As will be readily apparent, the module assembly 18 may be easily adapted for use in various other types of housings intended to be employed in detecting and measuring humidity in sheet material, or in other material.

By the provision of the male and female fasteners 19 and 20, engaging respectively with the female and male stud elements 59 and 60, correct positioning of the module 18 with respect to the block 16 is assured.

While a specific embodiment of a humidity measuring probe device for use with sheet material has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A device for testing the humidity of sheet material comprising an elongated flat rigid casing formed with perforations at a portion thereof, a handle member on one end of the casing, an elongated flat rigid body member in the casing extending from said handle member, said body member being formed at the end thereof opposite said handle member with a notch to define a pair of rigid fingers, a multi-contact terminal connector on said casing adjacent said handle member, a terminal block extending transversely between and engaging the ends of said fingers, a plurality of transversely spaced terminals on said terminal block, means disposed in said notch and extending through said body member connecting said last-named terminals to said terminal connector, and a relatively flat electrical humidity sensing unit secured to said fingers and having transversely spaced electrical terminals conductively engaging the terminals on the terminal block.

2. A device for testing the humidity of sheet material comprising an elongated flat rigid casing formed with perforations at a portion thereof, a handle member on one end of the casing, an elongated flat rigid body member in the casing extending from said handle member, said body member being formed at the end thereof opposite said handle member with a notch defining a pair of parallel rigid fingers at the opposite sides thereof, a multi-contact terminal connector on said casing adjacent said handle member, a terminal block fitting between and engaged against the ends of said fingers, a plurality of transversely spaced terminals on said terminal block, conductor means disposed in said notch and extending through said body member and electrically connecting said terminals to said terminal connector, a relatively flat electrical humidity sensing unit disposed in the casing forwardly adjacent to said terminal block and having transversely spaced electrical terminals located to conductively engage the terminals on the terminal block, respective side lugs on the end of the sensing unit adjacent the ends of the fingers, and respective fastening members extending through said side lugs and through the ends of the terminal block, securing the sensing unit to the ends of the fingers and holding said last-named electrical terminals in conductive contact with said first-named terminals.

3. The structure of claim 2, and wherein the sensing unit is provided with a perforated housing consisting of a pair of identical mating segments secured together and defining an enclosure, each segment including one of the side lugs.

4. The structure of claim 2, and wherein the sensing unit comprises a flat housing consisting of a pair of mating perforated segments secured together and defining an enclosure, and at least one bifilar-wound humidity sensing element clamped between the segments and electrically connected to the electrical terminals of the unit.

5. The structure of claim 4, and wherein the segments are formed with opposing recesses receiving an end portion of the humidity sensing element.

6. The structure of claim 2, and wherein the sensing unit comprises a flat housing consisting of a pair of mating perforated segments secured together and defining an enclosure, and a plurality of parallel rod-like bifilar-wound humidity sensing elements clamped between the segments and electrically connected to the electrical terminals of the unit, the segments being formed with opposing recesses receiving the end portions of the humidity sensing elements.

7. A humidity sensing module assembly comprising a pair of mating recessed relatively flat perforated segments secured together and defining an enclosure having parallel perforated main walls, said segments being formed at one end with opposing pairs of positioning recesses, a plurality of parallel rod-like bifilar-wound humidity sensing elements disposed in said enclosure with their ends seated in said opposing recesses, said sensing elements having enlarged opposite ends fitting between said main walls, a flat terminal board having exposed terminals secured between the opposite ends of the segments, and means connecting the sensing elements to said terminals.

8. A humidity sensing module assembly comprising a pair of mating recessed relatively flat perforated segments secured together and defining an enclosure having parallel perforated main walls, said segments being formed at one end with opposing pairs of positioning recesses, a plurality of parallel rod-like bifilar-wound humidity sensing elements disposed in said enclosure with their ends seated in said opposing recesses, said sensing elements having enlarged opposite ends fitting between said main walls, a flat terminal board having exposed terminals secured between the opposite ends of the segments, means in the enclosure interconnecting the sensing elements to define an electrical network, and means connecting said network to said terminals.

9. A humidity sensing module assembly comprising a pair of relative flat mating recessed perforated body segments secured together and defining an enclosure having parallel perforated main walls, a plurality of parallel rod-like bifilar-wound humidity sensing elements clamped in side-by-side relation between said main walls, a flat terminal board secured between the adjacent ends of the segments and having an exposed portion projecting outwardly from said adjacent ends, a plurality of spaced exposed flat terminals on said exposed portion, and means connecting the sensing elements to said terminals.

10. A humidity sensing module assembly comprising a pair of relatively flat mating recessed perforated body segments secured together and defining an enclosure having parallel perforated main walls, a plurality of parallel rod-like bifilar-wound humidity sensing elements clamped in side-by-side relation between said main walls, a flat terminal board secured between the adjacent ends of the segments and having an exposed portion projecting outwardly from said adjacent ends, a plurality of spaced exposed flat terminals on said exposed portion, means in the enclosure interconnecting the sensing elements to define an electrical network, and means connecting the network to said terminals.

References Cited by the Examiner
UNITED STATES PATENTS

| | | | |
|---|---|---|---|
| 2,526,636 | 10/50 | Colman | 73—73 |
| 2,723,557 | 11/55 | Ohlheiser | 73—73 |

RICHARD C. QUEISSER, *Primary Examiner.*

DAVID SCHONBERG, *Examiner.*